United States Patent [19]
Yoshida et al.

[11] Patent Number: 5,544,426
[45] Date of Patent: Aug. 13, 1996

[54] APPARATUS AND METHOD FOR PROCESSING MOISTENED POWDER AND GRANULAR MATERIALS

[75] Inventors: Katunori Yoshida; Ichirho Koizumi; Kohichi Kimura; Nobuharu Moriya, all of Osaka, Japan

[73] Assignee: Fuji Paudal Kabushiki Kaisha, Osaka, Japan

[21] Appl. No.: 248,966

[22] Filed: May 25, 1994

[30] Foreign Application Priority Data

Jul. 13, 1993 [JP] Japan ................... 5-196818

[51] Int. Cl.⁶ ............................................ F26B 5/08
[52] U.S. Cl. .............................. 34/314; 34/326; 34/58
[58] Field of Search ....................... 34/312, 313, 314, 34/315, 326, 327, 58

[56] References Cited

U.S. PATENT DOCUMENTS

| | | |
|---|---|---|
| Re. 27,214 | 11/1971 | Nakahara . |
| 3,175,686 | 3/1965 | Rieth ........................................ 34/314 |
| 3,579,719 | 5/1971 | Moriya . |
| 4,445,281 | 5/1984 | Aigoo ........................................ 34/58 |
| 4,489,504 | 12/1984 | Hammer . |
| 4,512,088 | 4/1985 | Clapper ...................................... 34/58 |
| 4,691,448 | 9/1987 | Alstetter et al. ........................... 34/314 |
| 4,735,220 | 4/1988 | Chandler .................................... 34/58 |
| 5,174,045 | 12/1992 | Thompson et al. ......................... 34/58 |

FOREIGN PATENT DOCUMENTS

| | | | |
|---|---|---|---|
| 21491 | 12/1946 | Finland ...................................... 34/312 |
| 3006788A1 | 9/1980 | Germany . |
| 1444601 | 12/1988 | U.S.S.R. ..................................... 34/315 |

Primary Examiner—John T. Kwon
Attorney, Agent, or Firm—Shefte, Pinckney & Sawyer

[57] ABSTRACT

Moistened powder and granular materials, such as produced by an extrusion granulator, are disintegrated into uniformly sized and shaped granules by an apparatus having a cylindrical housing and a working plate rotatably disposed in the housing in coaxial alignment with said housing, with an opening at the center of the working plate. A working fluid is introduced into the interior of the housing above the working plate through a wall of the housing and moistened powder and/or granular raw materials are supplied into the housing onto the working plate. The treated materials are discharged through the central opening in the working plate.

11 Claims, 15 Drawing Sheets

5,544,426

APPARATUS AND METHOD FOR PROCESSING MOISTENED POWDER AND GRANULAR MATERIALS

BACKGROUND OF THE INVENTION

The present invention relates to apparatus for disintegrating extrudates from various types of extrusion granulators in which moistened powder raw materials are forced through die holes to form generally cylindrical extrudates.

Extrusion granulators are widely employed in the pharmaceutical, food, fertilizer, agrochemical, feed stuff, catalyst, ceramics, and like industries for the production of granules generally on the order of from less than one millimeter (1 mm) diameter to several millimeters in diameter. In the typical production of granules by extrusion granulators, powder raw materials are initially moistened by mixing with liquid and/or binding agents. The moistened raw materials are often further treated in a kneading apparatus to obtain improved plasticity and are then extruded through multiple die holes in the extrusion granulator. Each cylindrical extrudate which emerges through the die holes hangs from the die surface due to gravity until its own weight causes it to sever or break. Therefore, the granules obtained in this manner are of random length, and generally have a widely varying aspect ratio (i.e., the ratio of the longitudinal dimension of the extrudate to its transverse or diametric dimension), which can range on the order of from ten to several hundred depending upon the extrudate's strength and plasticity. Moisture in the extrudates is conventionally removed in various types of dryers such as a fluid-bed dryer, a rotary dryer, or a band-type dryer to obtain acceptable final moisture contents.

In many industries, granules with homogeneous length and small aspect ratio are increasingly demanded depending upon the intended application. For example, in the Japanese pharmaceutical industry, variations in granular form should be within a predetermined size limitation, i.e., +10 Mesh= 0(%), +12 Mesh ≦5(%) and −42 Mesh≦15(%). To meet these requirements, the dried extrudates are treated in a disintegrator under dry conditions in which large conglomerates of the extrudates, which are often formed in the dryer, are disintegrated into uniformly-sized individual granules. Typically, the disintegrator accomplishes a rough grinding of the extrudate to break and separate individual extrudate strands which may have agglomerated to one another into the form of a block or lump. For example, a disintegrator may be equipped with knife-type cutter blades rotating within a screen or a rotating screen with stationary bars or blades disposed therein. The screen around the cutter elements is of a selected mesh size to classify the crushed extrudates by permitting only smaller granules less than the mesh size of the screen to pass the screen and be discharged. The granules thusly produced may undergo a final sifting by a sieving apparatus, if necessary or desired, in order to remove granules which are too fine and too coarse.

The conventional methods described above for the continuous production of uniformly sized granules with a small aspect ratio, i.e., by sequential extrusion granulation, drying, disintegration, and sieving, have disadvantages and a more improved process is demanded in consideration of various desired parameters. For example, during disintegration of agglomerated extrudates, the extrudates are subjected to impulsive force by the rotating elements and make their way through the screen due to centrifugal force created by the rotating element. In many cases, a considerable amount of dust (often referred to as fines) is generated during the process, resulting in a low product yield.

In the case of sticky materials, the wet extrudates emerging through the die holes in the extrusion granulator tend to stick together, forming noodle-like bunched conglomerates, which raise problems in the drying process. If the extrudates are dried in a band-type or stationary tray-type dryer, these noodle-like conglomerates are left in a conglomerate state, and in case of fluid-bed dryers, the fluidizing gas energy is not normally strong enough to disintegrate the conglomerates. In both cases, homogeneous drying cannot be achieved and product yield is low.

If fine granules, e.g., 0.5 mm or below in diameter, are required, a very large drag force may be generated in the granulator due to friction between the extrudates and the internal walls of the die holes, resulting in excessive heat generation and lower production capacity. This problem can be solved to some extent by improving the plasticity of the raw materials to be extruded by increasing the amount of moisture (usually by liquid addition) and/or binder, but this normally causes sticking problems as described above.

Attempts have been made to use a dry disintegrator of the aforementioned type equipped with a screen for the purpose of disintegrating wet and sticky extrudates before drying is accomplished, but this was found unsatisfactory because of screen clogging and material sticking to the interior of the apparatus.

From a production capacity viewpoint, it is also preferable that a process be continuous instead of a batch-type operation.

SUMMARY OF THE INVENTION

It is accordingly an object of the present invention to provide such an apparatus for processing moistened powder and granular materials which overcomes the problems of conventional processes and apparatus and satisfies the market needs, as above-described.

Briefly summarized, the apparatus of the present invention achieves the foregoing objective by providing a cylindrical housing and a working plate rotatably disposed in the housing in coaxial alignment with said housing, with an opening at the center of the working plate. A working fluid is introduced into the interior of the housing above the working plate through a wall of the housing and moistened powder and/or granular raw materials are supplied into the housing onto the working plate. The treated materials are discharged through the central opening in the working plate.

In the preferred embodiment of the apparatus of this invention, a plurality of nozzles are provided for jet-like injection of the working fluid into the housing. The nozzles may be oriented at the same fluid injecting angle as one another or alternatively at differing angles from each other. In certain embodiments, the nozzles can be selected to be oriented in the same rotational direction as the working plate, or alternatively, opposite to the rotational direction of the working plate. Additionally, it is possible to have means for injecting liquid into the working zone.

The rotational action of the working plate in coaxial alignment within the housing gives the charged extrudates a rolling and disintegrating effect. In addition, the extrudates are dried on their surface and are dispersed and disintegrated by the fluid jets injected from the nozzles disposed about the housing wall above the working plate. Extrudates on the working plate progress toward the center of the working plate against the centrifugal force created by the plate rotation due to the opposing inwardly directed fluid dynamic drag force created by the gas jets and the extrudates are continuously discharged through the opening disposed near the center of the working plate. Thus, the combined effect of the rotating plate and the gas jets makes it possible to process moistened extrudates into uniformly-sized granules with a relatively small aspect ration on a continuous basis.

If the angle of the gas jets is selected to be opposite to the rotational direction of the working plate, the extrudates under circulation on the working plate are subjected to a stronger shear force, producing an increased dispersion and disintegration effect on the extrudates. This reversed injected gas flow overcomes the centrifugal force imposed on the extrudates to transport them inwardly to the center of the working plate, whereat the gas stream and granules are continuously discharged through the central opening of the working plate.

If the angle of the gas jets is selected to be the same as the rotational direction of the working plate, the shear and disintegrating effect due to gas jets is also applied to the extrudates. In this case, the centrifugal force applied to the materials is increased and therefore the circulatory effect is enhanced.

DESCRIPTION OF THE PREFERRED EMBODIMENT

Figure 1:
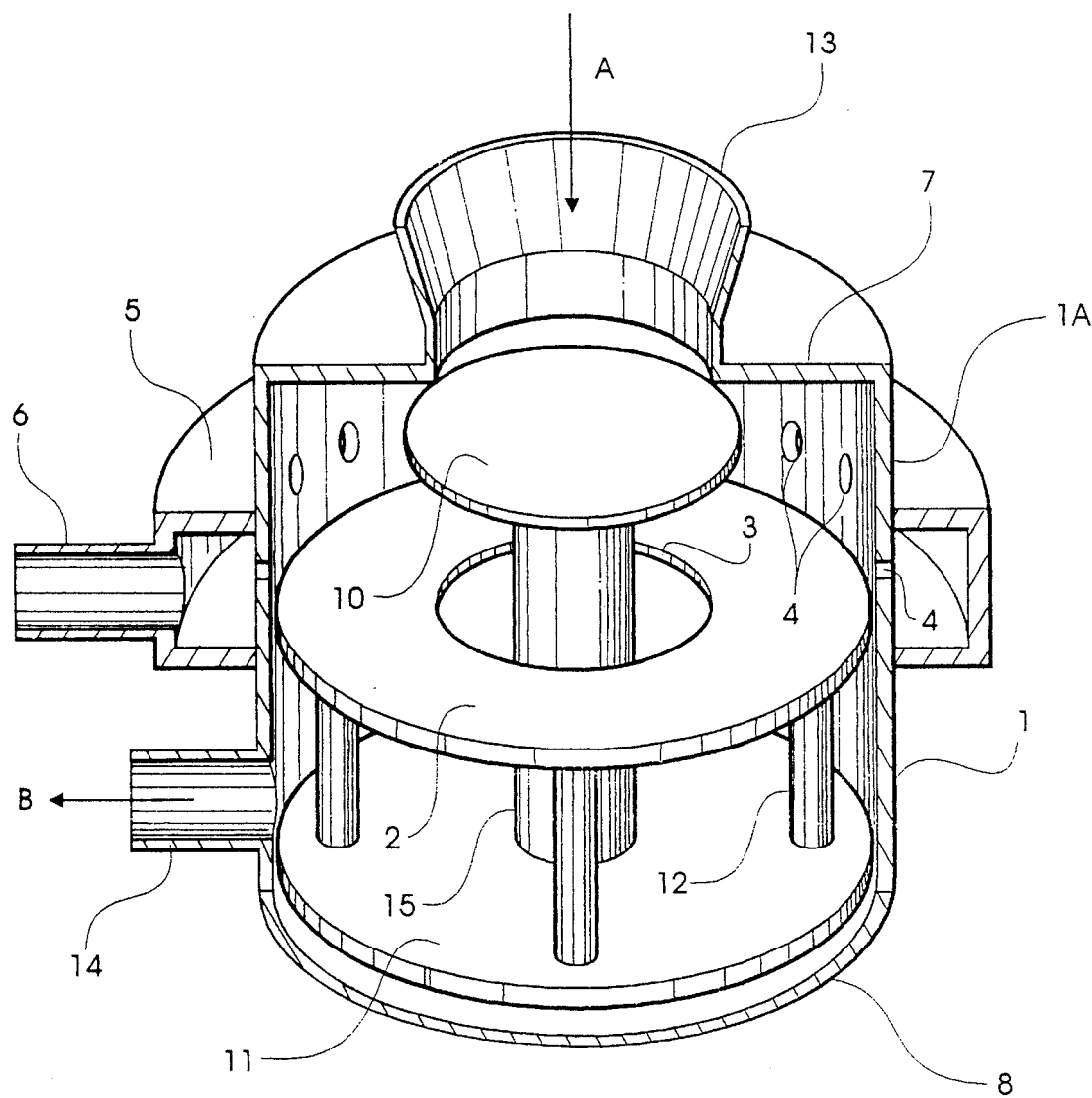
FIG. 1 is a perspective view, partially broken away, of an apparatus according to one preferred embodiment of the present invention.
Figure 2:
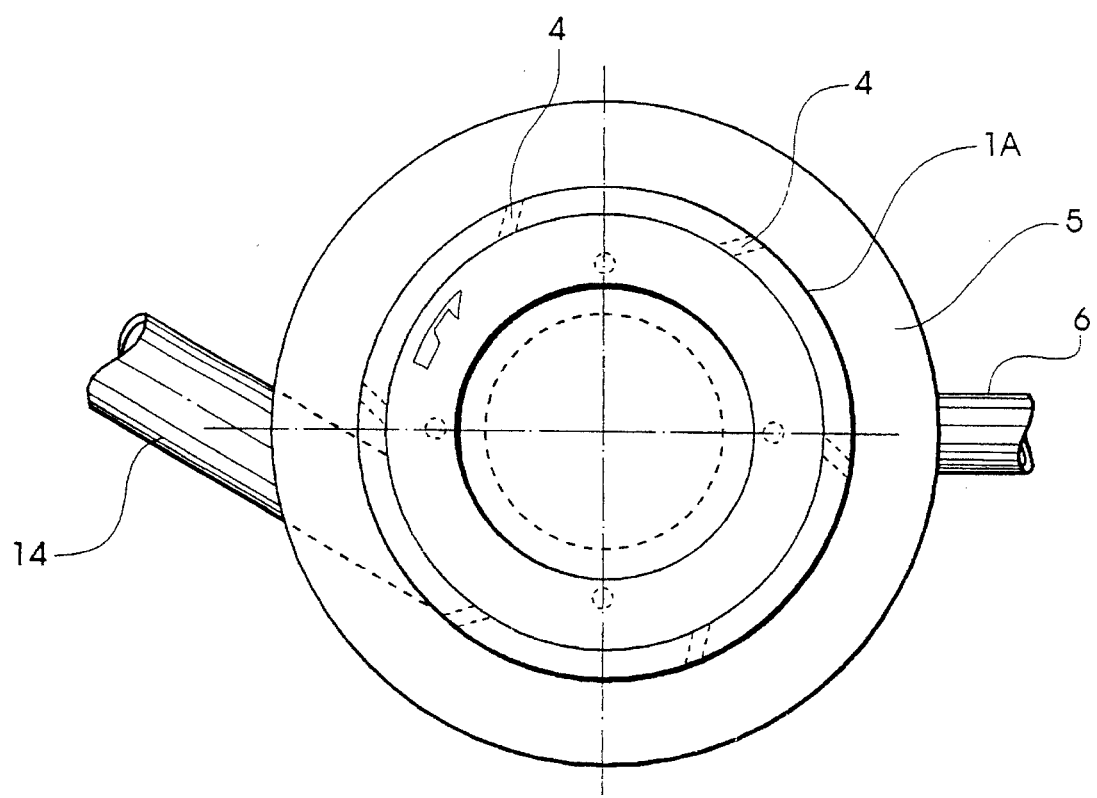
FIG. 2 is a top plan view of the apparatus of FIG. 1.
Figure 3:
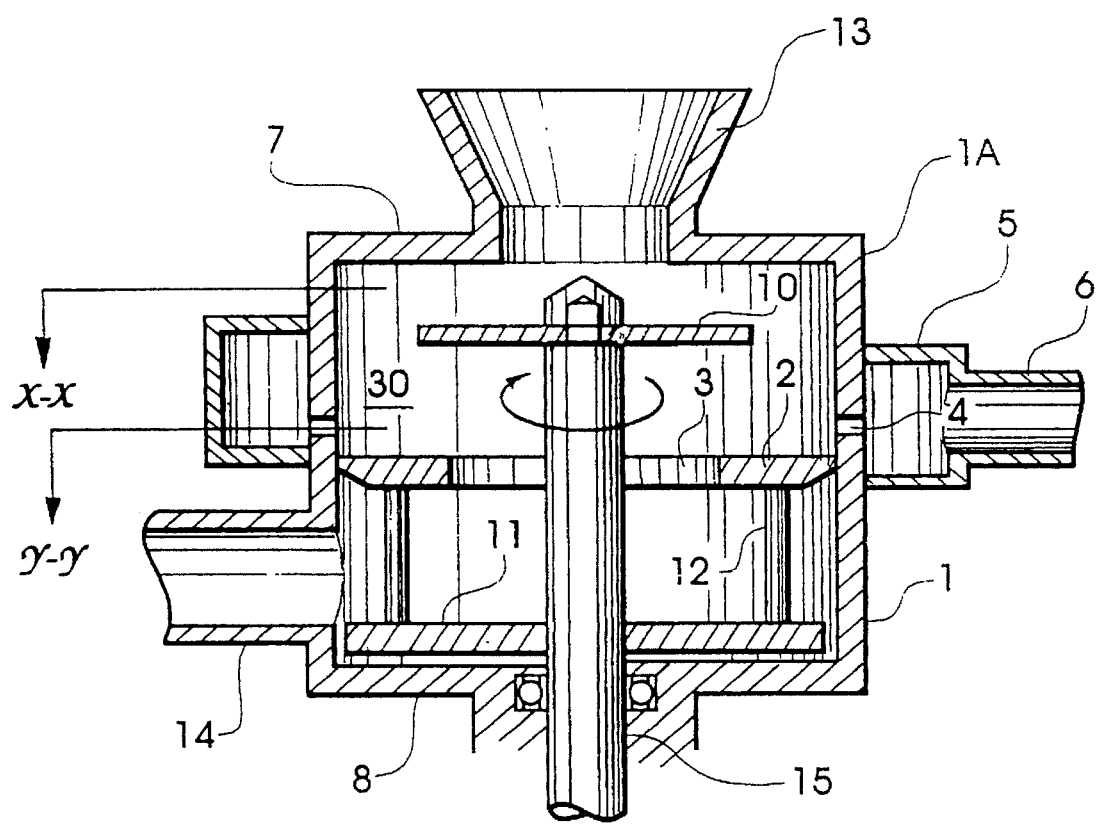
FIG. 3 is a vertical cross-sectional view of the apparatus of FIG. 1.

Referring now to the accompanying drawings, FIG. 1 is a schematic perspective representation of one preferred embodiment of the invention, partially in section, while FIG. 2 shows a top plan view and FIG. 3 shows a vertical section of the same apparatus. In FIGS. 1, 2, and 3, the apparatus basically comprises a housing 1, a working plate 2 disposed in the housing 1, a distribution plate 10 disposed above the working plate 2, and a discharge plate 11 disposed below the working plate 2. The distribution plate 10 is fixed coaxially to an upper end of a shaft 15, which passes through and is affixed coaxially to the center of the discharge plate 11. The working plate 3 is fixed coaxially and parallel to the discharge plate 11 at the upper ends of circumferentially-spaced supporting bars 12 extending therebetween. An appropriate drive motor or other like drive means (not shown) is connected to the shaft 15 below the bottom end 8 of the housing 1 for driving the shaft 15 to rotate the plates 2,10,11. Although in FIGS. 1, 2, and 3 the plates 2,10,11 are driven by one common shaft, it is also possible to rotate each plate independently at an independent rotational speed.

The working plate has an opening 3 at its center concentrically about the drive shaft 15, and the diametric size of the distribution plate 10 is larger than the diameter of the opening 3 for preventing the extrudates charged into the housing from directly passing into the opening 3 without being deflected into contact with the working plate 2.

In the apparatus of FIGS. 1, 2, and 3, the housing 1 has a top end wall 7 with a central material charge port 13, and a bottom end wall 8 above which a material discharge port 14 opens laterally through the side wall of the housing 1. Extrudates are charged into the top of the housing 1 through the port 13 and onto the distribution plate 10. However, it is also possible to charge the materials directly onto the working plate 2 radially outwardly of the opening 3, in which case the distribution plate 10 can be eliminated.

A plurality of nozzles 4 open through the side wall of the housing 1, in circumferential alignment with one another at a location above the working plate 2, for injecting a working fluid (air or other gas) inwardly into the housing 1. The working fluid is delivered to the nozzles 4 for injection into the housing 1 via a fluid conduit 6 connected to a source of the pressurized gas and an annular pressure chamber 5 encircling the housing 1 about the nozzles 4. The cylindrical area within the housing above the working plate 2 where gas jets are injected defines a working chamber. In embodiments equipped with the distribution plate 10, the space between the plate 10 and the plate 2 defines the working chamber.

In operation, extrudates from an extrusion granulator are continuously fed into the housing 1 through the charge port 13 onto the rotating distribution plate 10, by which the extrudates are initially deflected and dispersed circumferentially outwardly and then downwardly into the working chamber through an annular clearance between the distribution plate 10 and the internal wall of the housing 1. In the working chamber, the extrudates contact the rotating working plate 2, imparting a twisted rope-like movement and subjecting the extrudates to a spinning and circulating motion which creates a disintegration effect on the extrudates due to frictional and impacting forces generated by the working plate and the housing internal wall. Preferably, the upper surface of the working plate may be knurled or otherwise roughened or indented by formation of crossing grooves therein to serve as a more effective cutting and rubbing element.

Simultaneously, gas jets are injected into the working chamber through the nozzles 4 causing the centrifugally propelled circulating extrudates to change their direction upon contact with the gas jets to travel inwardly toward and through the opening 3 at the center of the working plate 2 onto the discharge plate 11. The granules thusly processed are forced outwardly due to the centrifugal force imposed by the rotating discharge plate 11 and are thereby directed into and through the discharge port 14. Instead of employing a rotating discharge plate, it is alternatively possible to discharge the granules towards the discharge port by means of a scraping element.

Figure 4:
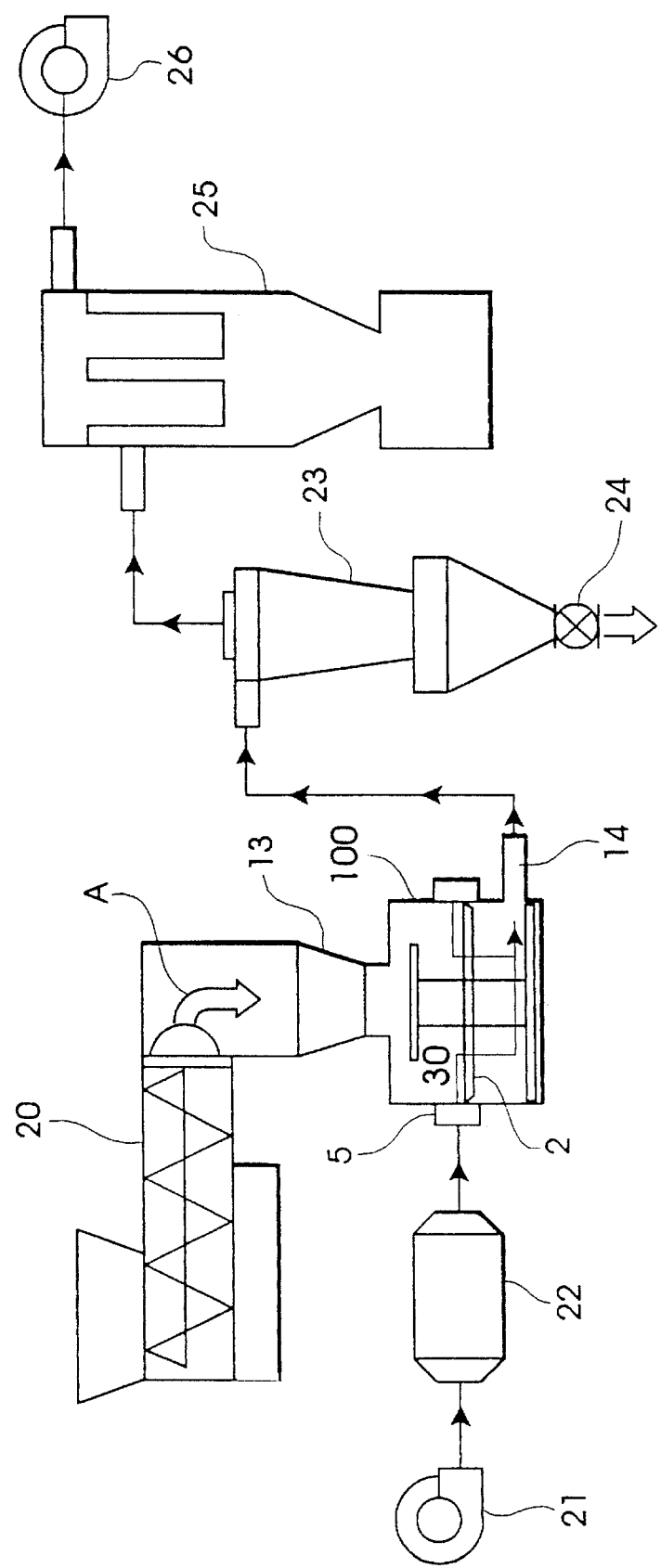
FIG. 4 is a schematic drawing of a granule producing system including the apparatus of the present invention.

FIG. 4 shows an exemplary overall system for producing granules, in which the apparatus of the present invention is preferably employed. Moistened extrudates A produced by an extrusion granulator 20, e.g., of the type described in U.S. Pat. No. 5,240,400, are charged into the wet-type disintegrator 100 of this invention through the charge port 13. Means for supplying a pressurized gaseous fluid, e.g., a blower 21, is provided to generate and deliver a fluid flow through a gas heater 22 (or gas cooler) into the pressure chamber 5 and through the plural nozzles 4, from which the gas jets are injected into the working chamber 30 in the disintegrator 100. Granules are disintegrated and uniformly sized in the working chamber 30 by the combined effects of the working plate 2 and the gas jets and are then discharged through the discharge port 14, as above described.

The discharge port 14 communicates with a conduit which delivers the discharged granules entrained in the gas stream into a cyclone dust separator 23 wherein the granules are separated from the gas stream and continuously discharged through a rotary valve 24 (or another gas-tight feeder) to a following process station, such as a continuous dryer. The gas stream from the cyclone separator is directed into a bag filter 25 wherein the gas is further cleaned of dust and the clean gas is then exhausted through a suction blower 26.

Figure 5:
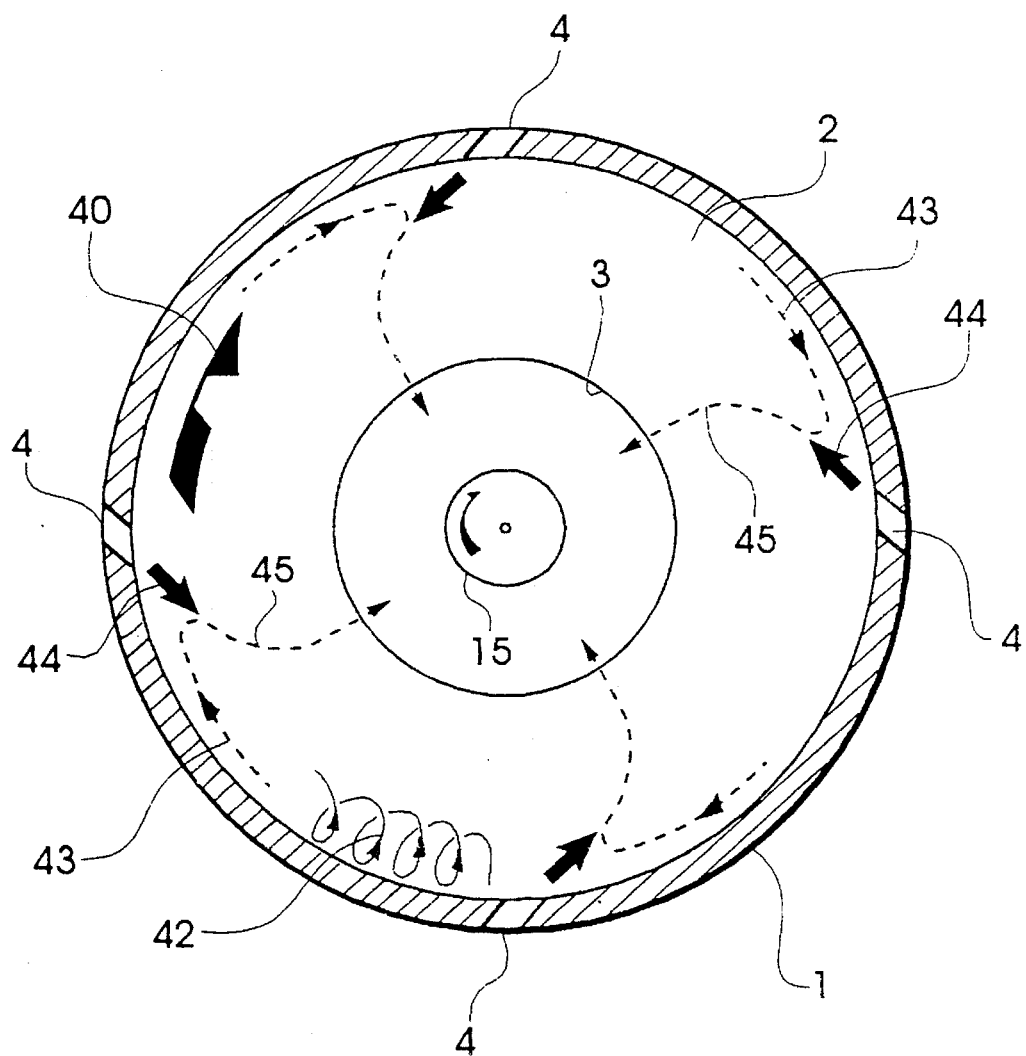
FIG. 5 is a horizontal cross-sectional view of the apparatus of FIG. 1, taken along line X—X in FIG. 3.
Figure 6:
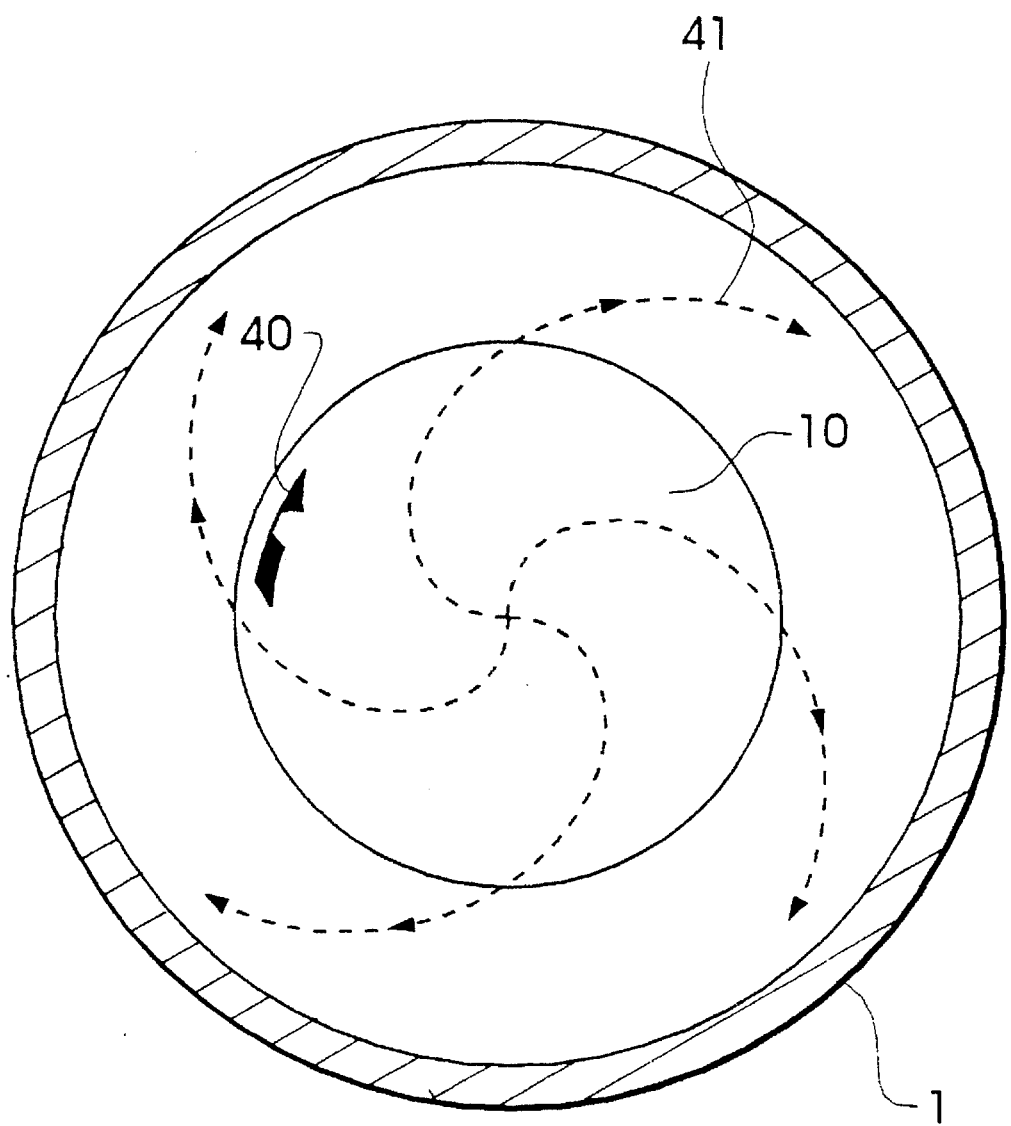
FIG. 6 is another horizontal cross-sectional view of the apparatus of FIG. 1, taken along line Y—Y in FIG. 3.
Figure 7:
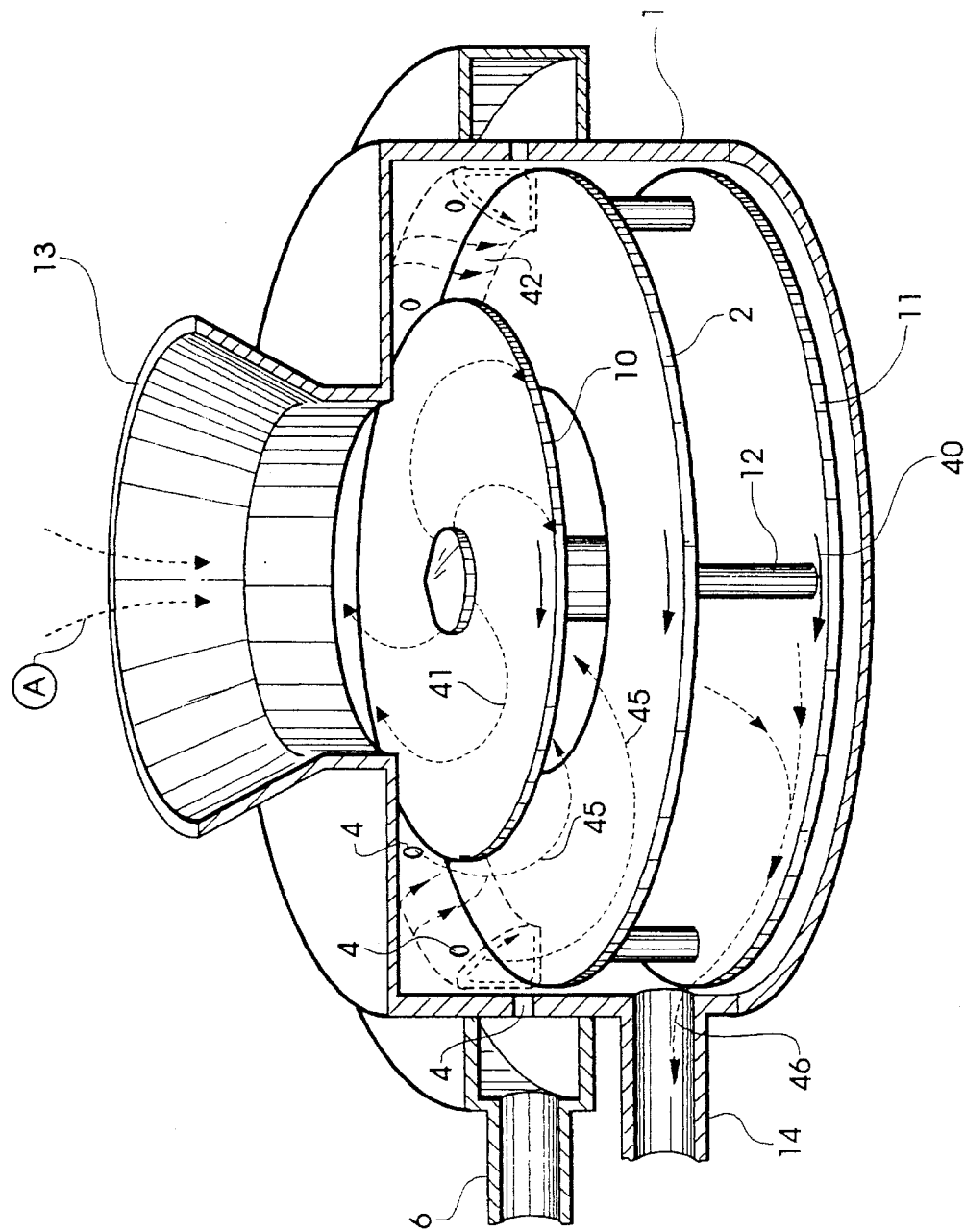
FIG. 7 is another partially broken-away perspective view of the apparatus of FIG. 1.

FIGS. 5, 6, and 7 are cross-sectional views of the disintegrator housing which schematically show the movement or flow pattern of the charge materials and gaseous working fluid in the apparatus of this invention. Specifically, FIG. 5 shows the centrifugal movement of the charge materials on the distribution plate 10 while FIG. 6 shows the movements of the charge material on the working plate 2 along with the injected flow of the working fluid through the nozzles 4. FIG. 7 shows the material and gas movement in the apparatus perspectively.

As illustrated in FIGS. 5, 6, and 7, the distribution plate 10, the working plate 2, and the discharge plate 11 are rotating unitarily in the same direction as shown by arrow 40, and the gas jets of the working fluid are injected through the nozzles 4 in the opposite direction indicated by the arrow 44 (see FIG. 6). In these drawings, the dotted lines 41 represent the pattern of flow of the charge material on the distribution plate 10, the line 42 represents the twist ropelike spinning and circulating pattern of material flow on the working plate 2, and the arrow 44 represents the direction in which the gas jets eject the working fluid from the nozzles 4. The broken line 45 shows the material flow pattern due to the gas jets and the dotted line 46 (FIG. 7) show the material discharge flow pattern.

In FIG. 7, extrudates A produced by the extrusion granulator are fed through charge port 13 onto the distribution plate 10 and are dispersed around the plate 10 and spread outwardly as shown by the lines 41 due to its rotationally-induced centrifugal force. At the circumferential edge of the distribution plate 10, the extrudates A fall gravitationally downwardly into the working chamber 30 and onto the working plate 2.

In the working chamber 30, the charge materials are subjected to a twisting rope-like movement due to the combined effect of the centrifugal force of the rotating plate 2 and the inwardly directed jets 4, as indicated by the line 42, with the material as a whole circulating around the periphery of the working plate 2 in the direction of its rotation as indicated by arrow 43. As the material encounters the reversely oriented gas jets injected through the nozzles 4 during the material circulation in the direction 43, the centrifugal force acting on the material is counter-acted and the gas jets re-direct the material in the direction 45 toward the central opening 3.

The above-described action on the charge material in the apparatus of this invention serves to disperse and disintegrate the material in the following manner. Sticky extrudates or extrudates with a high moisture content emerging from the die holes in the extrusion granulator tend to stick together, forming noodle-like conglomerates, as aforementioned. These extrudates, when charged onto the distribution plate 10, are forced to move outwardly and are primarily dispersed due to centrifugal force imparted by the plate 10. In the following working chamber, longer extrudates and conglomerated extrudates undergo the described twisted rope-like spinning and circulating movement 42,45 and are thereby secondarily dispersed and disintegrated in combination with the effect of the injected gas jets.

By blowing the gas jets into the working chamber, the charge materials are dried on their surface which prevents the materials from re-agglomerating or forming new "secondary" agglomerates and additionally from adhering to the interior surfaces of the apparatus. Another effect of the gas jets is that materials are accelerated by the circulating gas energy and caused to collide with each other which results in an additional dispersion and disintegration effect to enhance the formation of uniformly sized granules with small aspect ratio in a very short period of time.

Various operational and design parameters of the apparatus affect the production capacity of the apparatus as well as the physical properties of the granules produced, for example, (1) the rotational speed of working plate, (2) the size of the opening 3 on the working plate, (3) the number of the nozzles 4, (4) the angle of nozzles 4, (5) the gas injecting direction of nozzles in relation to the rotational direction of the working plate, (6) the gas injecting velocity, and (7) the flow rate of the injected gas. The optimal values for these parameters in any given operation is selected depending upon the physical properties of the materials to be processed and upon the granule quality required.

For example, when handling extrudates with a relative high strength, it is normally recommended that the rotational speed of the working plate, the gas flow rate, and the gas velocity be selected at relatively higher values to increase the capability of the apparatus for disintegrating agglomerated extrudates.

Figure 8:
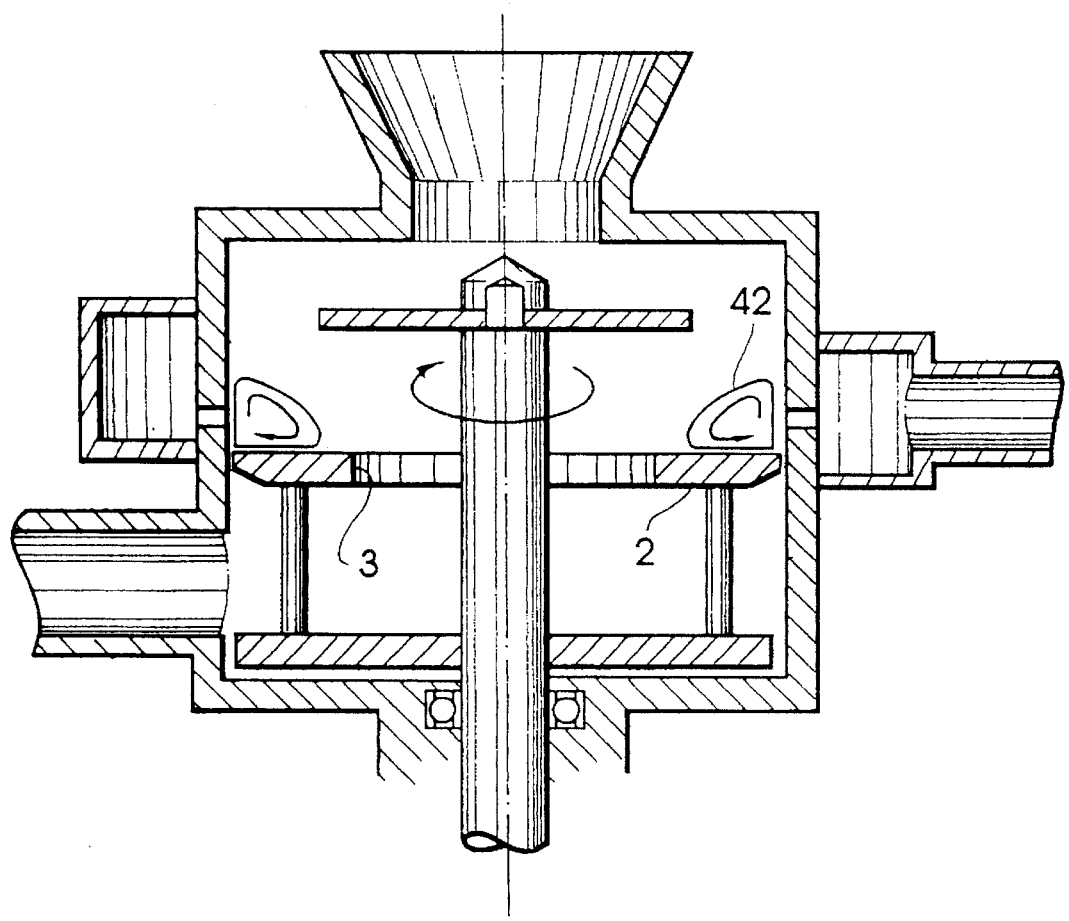
FIG. 8 is another vertical cross-sectional view of the apparatus of FIG. 1, showing the material circulation in the apparatus.

If the extrudate's strength is very high, the gas jet direction of at least some of the nozzles 4 should be selected to be same as the rotational direction and the gas velocity should be increased to obtain a stronger collision effect among the materials as well as between the gas jets and the charge materials. On the contrary, if the extrudate's strength is relatively low, the rotational speed of working plate, the number of the nozzles and the velocity of the gas jets should be decreased to reduce the disintegration energy created. If granules with a small aspect ratio are required, the quantity of the charge materials residing in the working chamber at any given time should be increased in order to increase the normal time period the materials are retained in the work chamber, which results in an increased quantity of materials annularly forming the twisted rope-like shape 42 over the periphery of the working plate 2 as shown in FIGS. 7 and 8.

Two types of forces are thusly applied to the materials in the working chamber. First, a centrifugal force is generated by the rotation of the working plate, which directs the materials outwardly to the periphery of the working plate. Second, drag or impelling forces due to gas jets convey the materials in the same direction as the working fluid is injected, the radial component of the overall gas flow creating an entraining drag force on the material tending to blow it into the central opening in the working plate. These drag forces collectively transport the materials in the working chamber inwardly towards the center of the working plate 2.

Figure 9:
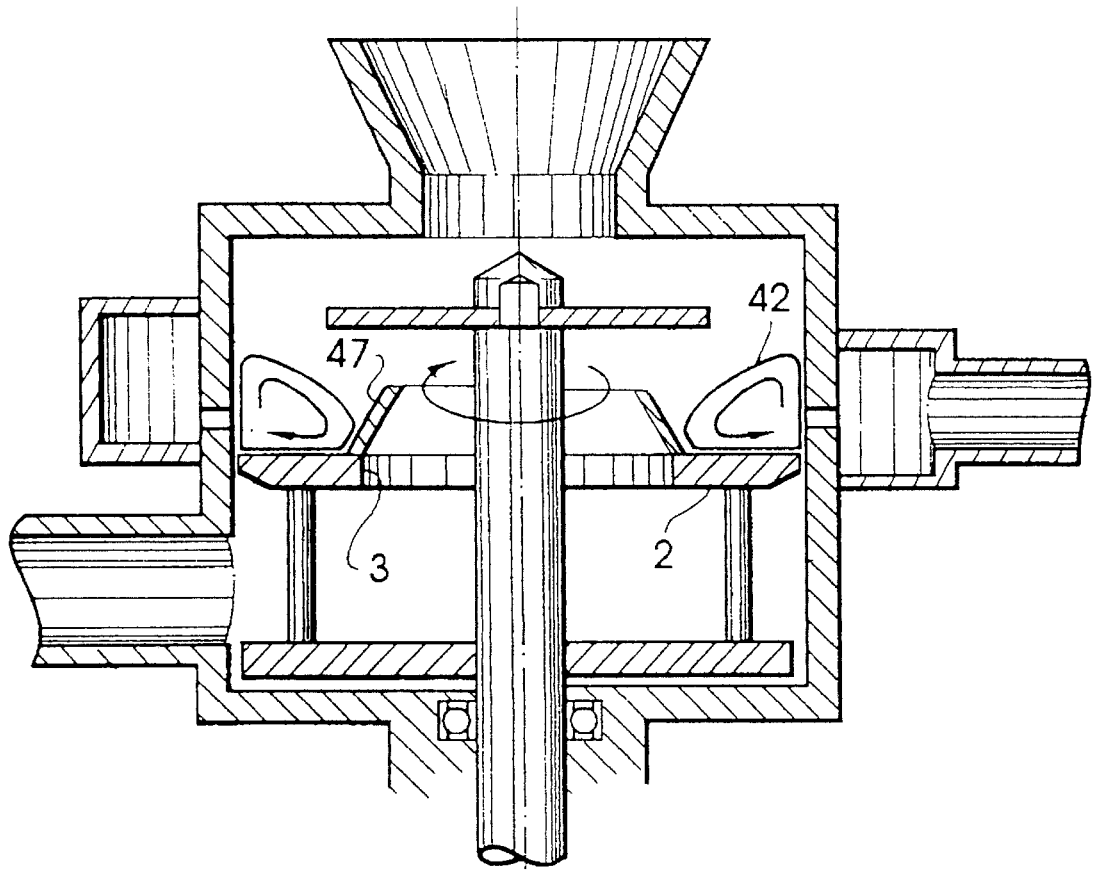
FIG. 9 is a vertical cross-sectional view of another preferred embodiment of the apparatus of the present invention, similar to FIG. 8, showing the material circulation in the apparatus.

The quantity of the material residing in the working chamber is controlled by the balance between the above-mentioned centrifugal force and drag forces. For example, if the gas flow rate is decreased and the working plate's speed is increased, the prevailing drag forces are reduced while the prevailing centrifugal forces are increased. As a result, the resident quantity of material in the working chamber is increased. Another method for controlling the resident material quantity in the working chamber is to mount a wall 47 around the opening 3 of the working plate 2 to inhibit the capability of the material to discharge from the chamber, as shown in FIG. 9.

Figure 10:
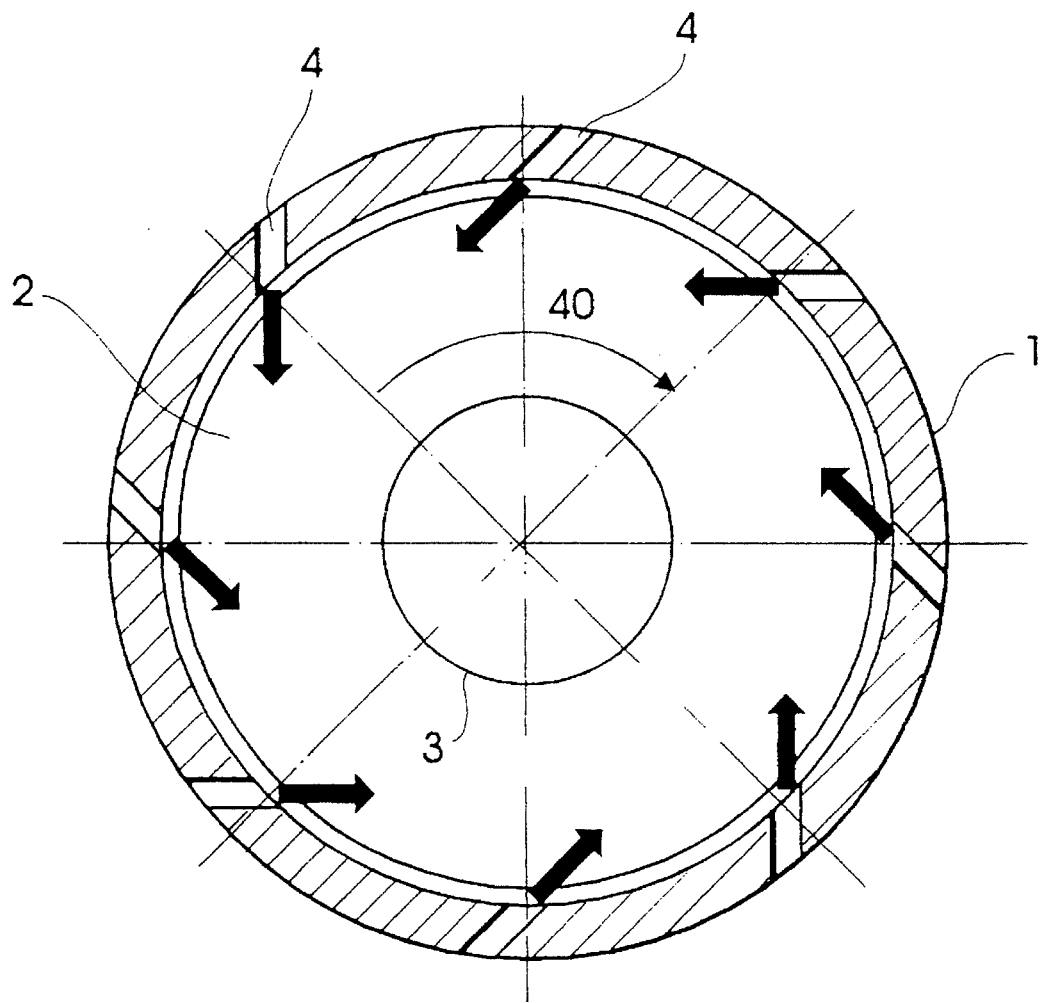
FIG. 10 is a horizontal cross-sectional view similar to FIG. 6, showing one example of the arrangement of the fluid injection nozzles in the housing of the present apparatus.
Figure 11:
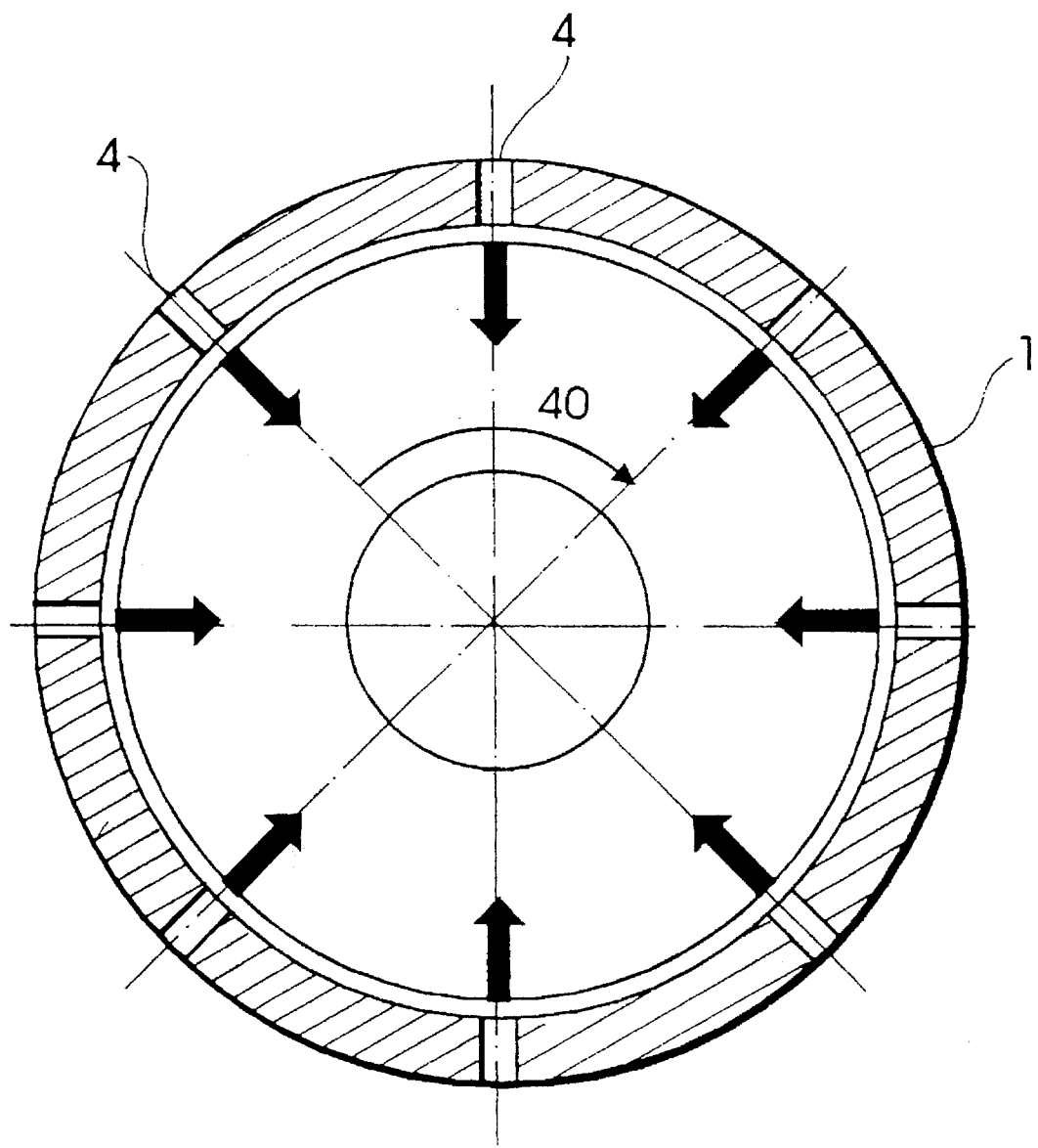
FIG. 11 is a horizontal cross-sectional view similar to FIG. 10, showing another example of the arrangement of the fluid injection nozzles in the housing of the present apparatus.
Figure 12:
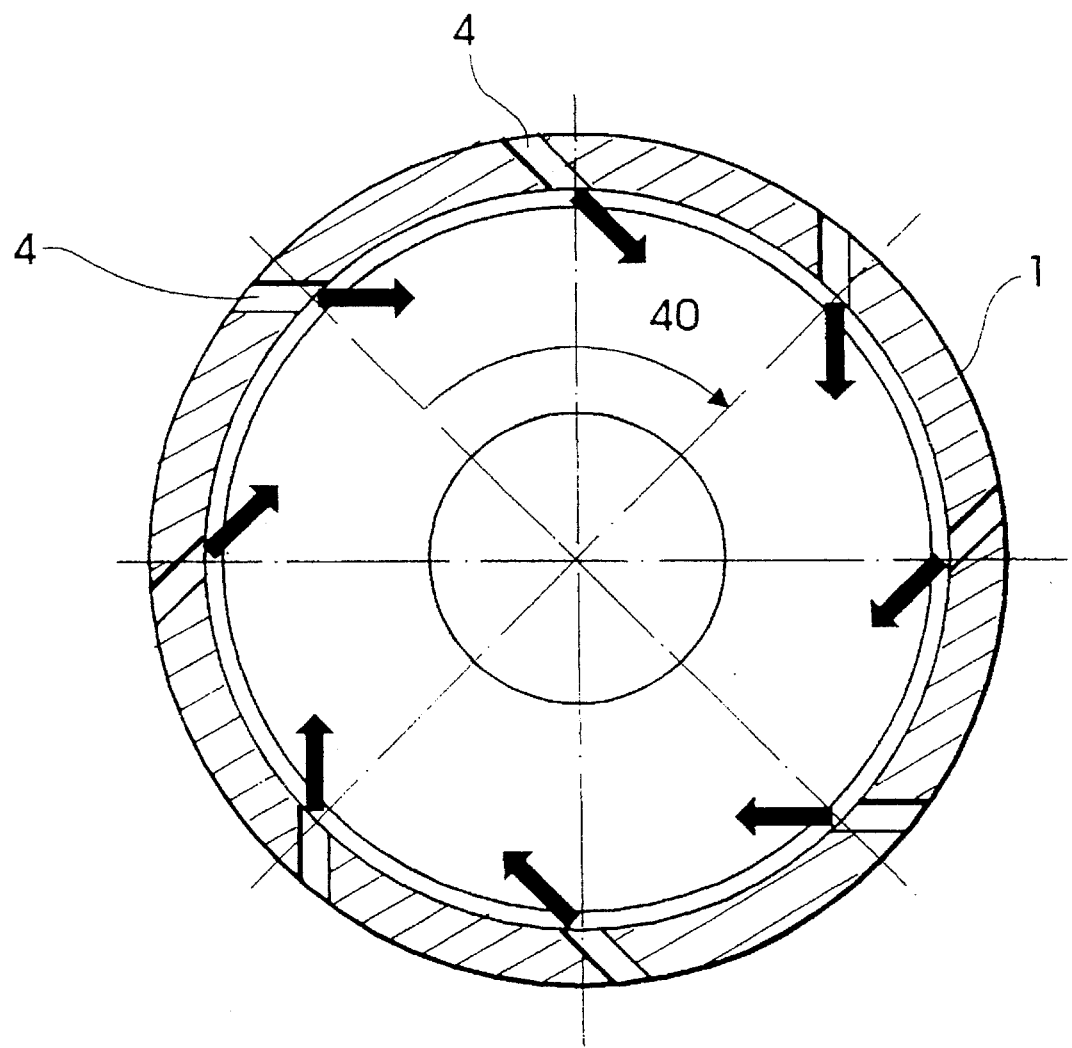
FIG. 12 is a horizontal cross-sectional view similar to FIGS. 10 and 11, showing another example of the arrangement of the fluid injection nozzles in the housing of the present apparatus.
Figure 13:
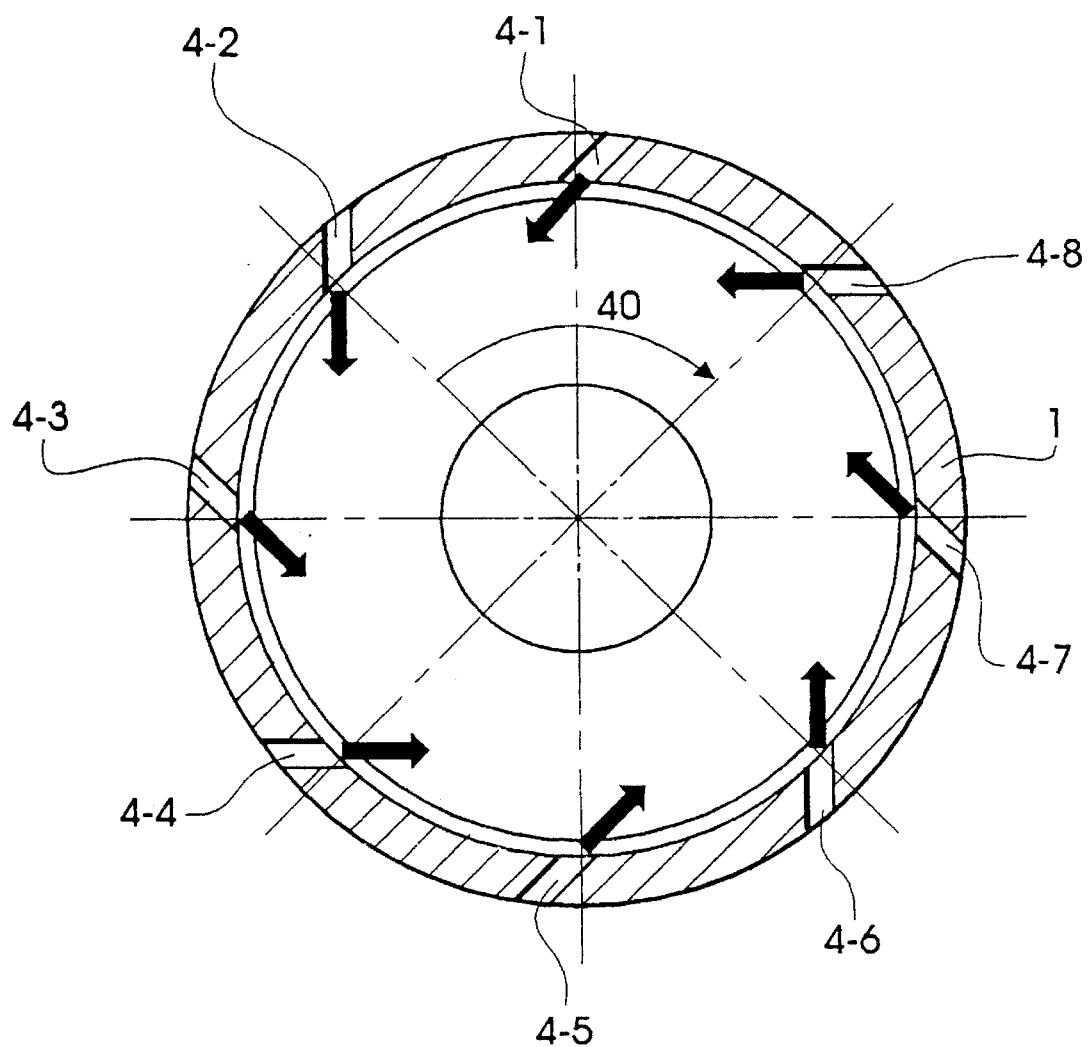
FIG. 13 is a horizontal cross-sectional view similar to FIGS. 10 and 11, showing another example of the arrangement of the fluid injection nozzles in the housing of the present apparatus.

FIGS. 10, 11, 12, and 13 illustrate differing gas-jet nozzles 4, wherein their gas injecting angle and/or direction are varied. In each of these embodiments, eight nozzles are formed in the housing wall and the rotational direction of the working plate 2 is clockwise, as indicated by the arrow 40. In FIG. 10, all of the gas jets are oriented at the same angle to inject the working fluid in the opposite direction to the rotation of the plate 2. In FIG. 11, all of the gas jets are oriented to inject the working fluid in the radial direction relative to the center of the plate 2. In FIG. 12, all of the gas jets are oriented at the same angle to inject the working fluid in the same direction as the rotation of the plate 2. In FIG. 13, two nozzles 4-1, 4-5 out of the eight nozzles are oriented to inject the working fluid in the same direction as the rotation of the plate 2 and the remaining nozzles are oriented to inject in the fluid in the opposite direction to the rotation of the plate 2. In such embodiment, it is contemplated that the velocity at which the working fluid is injected may be different for the differently oriented nozzles.

In each of the embodiments of FIGS. 10–13, all of the nozzles are arranged at the same height above the working plate 2. However, it is possible to form the nozzles at different heights relative to the plate 2. For example, a plurality of nozzle arrays can be arranged at different heights and, additionally, the gas injecting direction and angles of such nozzle arrays can be selected to be different.

For the purpose of handling a wide variety of materials with different physical properties, auxiliary functions may be added to the apparatus of the present invention. For example, in case of processing extrudates with very high moisture contents, a gas heater 22 can be mounted between the gas-supply blower 21 and the apparatus 100, as shown in FIG. 4, to supply hot gas for enhancing drying capability and to prevent secondary agglomeration and sticking problems. To best promote production of granules in a rounded shape with a smaller aspect ratio, longer material retention time in the working chamber is required, which can result in excessive evaporation of moisture in the granules, leading to generation of a considerable amount of dust from the liberation of dried particles from the surfaces of the granules. This problem can be solved by mounting one or more liquid spray nozzles in partial replacement of the gas jet nozzles to inject a liquid mist into the working chamber to maintain the moisture content of the granules at constant level.

As also shown in the system of FIG. 4, the internal pressure within the disintegrator 100 can be controlled by connecting the suction blower 26 to the discharge line 14 of the apparatus 100. By selecting the suction blower capacity (i.e., its gas flow rate and pressure) to be sufficiently strong to create negative pressure at the material charge port 13, extrudates from the extrusion granulator 20 can be charged without establishing seals between the granulator 20 and disintegrator 100, because extrudates are sucked into the charge port 13 with the atmospheric air. Additionally by the use of the suction blower 26, discharged granules can be pneumatically transported from the disintegrator 100 to a downstream location for subsequent processing or handling.

The advantageous effects of the present invention are empirically demonstrated by the results of actual disintegration testing, as summarized below. Table 1 below sets forth the actual operational conditions and parameters of the disintegrator during testing, while Table 2 sets forth the actual formulation of the raw materials tested. A twin-screw type front-extrusion granulator, such as that of U.S. Pat. No. 5,240,400, with a die hole diameter of approximately 0.5 mm, was employed for testing.

TABLE 1

| | |
|---|---|
| Housing inner diameter (mm) | Φ 400 |
| Diameter of the opening (mm) | Φ 230 |
| Gas jet ejecting direction | opposite to working plate |
| Gas jet ejecting angle (degree) | 45 |
| Total gas flow rate (m³/min) | 5 |
| Working plate rotational speed (rpm) | 400 |

TABLE 2

| Raw Materials | Proportion (by weight) |
|---|---|
| Talc powder | 70 (part) |
| Bentonite powder | 30 (part) |
| Water | 17(%) on dry basis |

Figure 14:
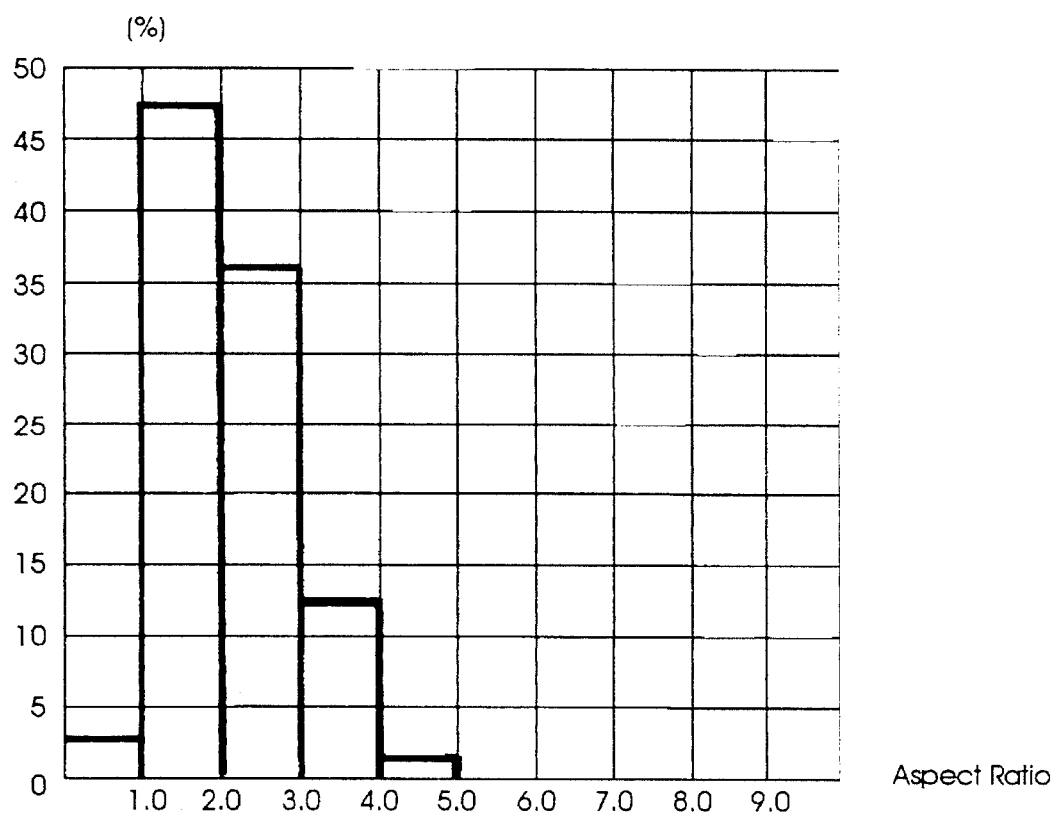
FIG. 14 is a bar graph showing the distribution of granule aspect ratio obtained by the present apparatus.
Figure 15:
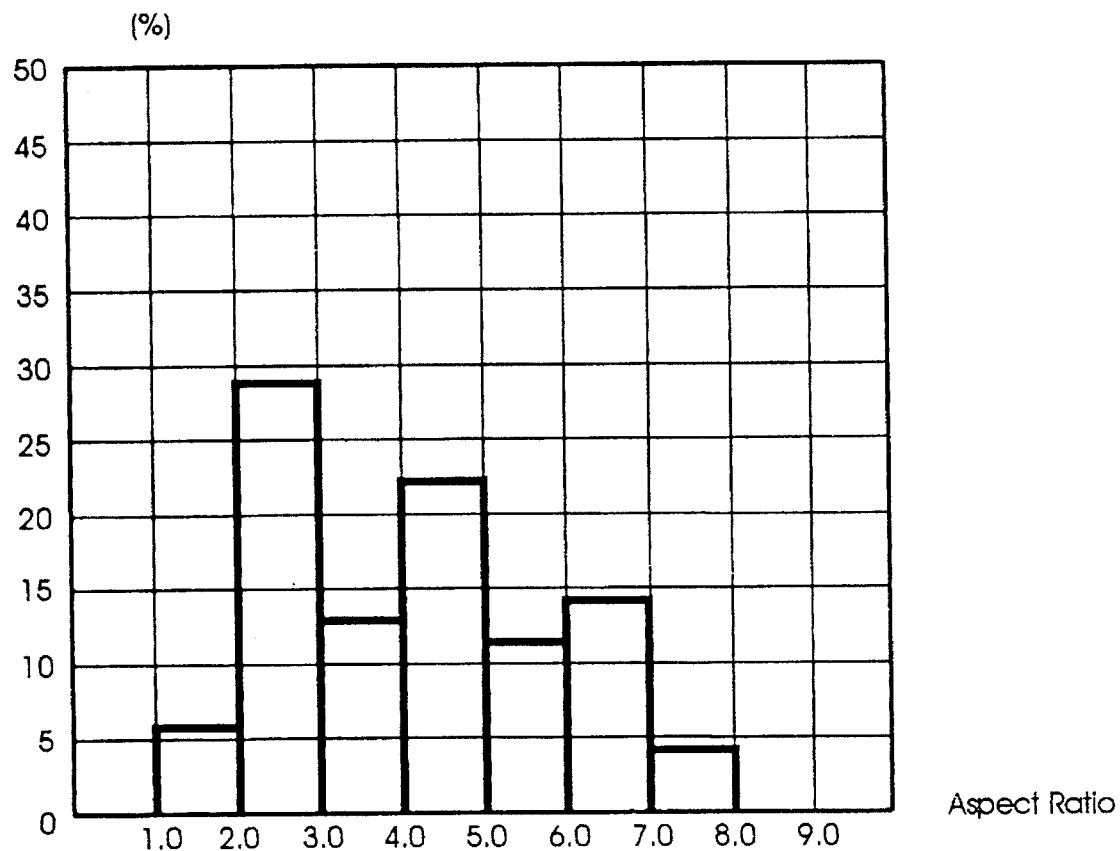
FIG. 15 is a similar bar graph showing the distribution of granule aspect ratio obtained by a conventional granule disintegrator.

Using the described apparatus, extrudates of 0.5 mm in diameter were continuously charged into the disintegrator of the present invention at a feed rate of 1500 kg/hr. After disintegration processing and subsequent drying in a fluid-bed dryer, a magnified photo of granules was taken and 200 granules were examined as to their aspect ratio, the results of which are shown in Table 3 below and charted in the graph of FIG. 14. Granules obtained by a conventional dry-type disintegrator (i.e., of the above-described type having rotating cutter blades and a 2 mm screen) were examined as to their aspect ratio under same procedure, the results of which are shown in Table 4 below and charted in the graph of FIG. 15.

TABLE 3

| Aspect Ratio | 0–1 | 1–2 | 2–3 | 3–4 | 4–5 | 5–6 | 6–7 | 7–8 | 8–9 |
|---|---|---|---|---|---|---|---|---|---|
| % | 3.0 | 47.0 | 36.0 | 13.0 | 1.0 | — | — | — | — |
| Mean Aspect Ratio | | | | | | | | | 2.02 |
| Standard Deviation | | | | | | | | | 0.67 |

TABLE 4

| Aspect Ratio | 0–1 | 1–2 | 2–3 | 3–4 | 4–5 | 5–6 | 6–7 | 7–8 | 8–9 |
|---|---|---|---|---|---|---|---|---|---|
| % | — | 5.7 | 28.6 | 12.9 | 22.8 | 11.4 | 14.3 | 4.3 | — |
| Mean Aspect Ratio | | | | | | | | | 4.04 |
| Standard Deviation | | | | | | | | | 1.66 |

A comparative analysis of the data thusly obtained shows that the mean aspect ratio of the granules obtained by the conventional disintegrator was about 4, while the mean aspect ratio of the granules produced by the apparatus of this invention was about 2, and the standard deviation of the aspect ratio of granules produced by this invention was much smaller than that of granules produced by the conventional disintegrator.

Further comparative examination was carried out to evaluate the amount of dust generated in both disintegration processes by means of sieve analysis. The amount of fines under 100 (mesh) in the granules produced by the conventional disintegrator was about 1.5% by weight, while that for the granules produced by this invention was about 0.3%, i.e., about 5 times smaller.

In summary, the present invention provides a continuous wet type disintegrator for sizing and disintegrating extrudates in a wet condition from an extrusion granulator with minimal dust generation. The apparatus of the present invention can advantageously be applied to noodle-like agglomerated extrudates with a high moisture content or sticky characteristics, without creating problems such as re-agglomeration in a subsequent drying process. In particular, gas jets are employed for dispersion and disintegration of the extrudates, by which any potential problem of material sticking to the interior of the apparatus is eliminated, resulting in stable continuous operation. Also, by controlling the temperature and humidity of the gas jets, it is possible to apply additional and multiple operations such as heating, cooling, and moisture removal, during the disintegration process.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An apparatus for processing moistened powder and granular materials comprising a cylindrical housing, a working plate rotatably mounted in said housing in coaxial alignment with said housing, said working plate having a central opening, means for introducing a working fluid internally into said housing above said working plate, means for supplying moistened powder and granular materials onto said working plate, and means for discharging processed materials through said opening of said working plate.

2. An apparatus according to claim 1 wherein said fluid introducing means comprises a plurality of nozzles, each oriented at a common angle and means for injecting working fluid through said nozzles at a uniform velocity.

3. An apparatus according to claim 1 wherein said fluid introducing means comprises a plurality of nozzles oriented at differing fluid injecting angles and means for injecting working fluid through said nozzles.

4. An apparatus according to claim 1 wherein said fluid introducing means includes means for injecting working fluid into said housing in the rotational direction of said working plate.

5. An apparatus according to claim 1 wherein said fluid introducing means includes means for injecting working fluid into said housing in a direction opposite to the rotational direction of said working plate.

6. An apparatus according to claim 1 wherein said fluid introducing means comprises a plurality of nozzles for injecting said working fluid, selected ones of said nozzles having a fluid injecting angle in the rotational direction of said working plate and other of said nozzles having a fluid injecting angle opposite to the rotational direction of said working plate.

7. An apparatus according to claim 1 wherein said fluid introducing means comprises multiple sets of said nozzles spaced axially from one another along said housing, the nozzles of each said set being oriented at a common fluid injecting direction with the other nozzles of the set.

8. An apparatus according to claim 1 wherein said fluid introducing comprises a plurality of nozzles spaced axially from one another along said housing, said nozzles being oriented at differing fluid injecting directions.

9. An apparatus according to claim 1 and further comprising means for introducing a liquid into said housing.

10. An apparatus according to claim 1 wherein said supplying means includes means for introducing into said housing extrudates produced by an extrusion granulator.

11. An apparatus according to claim 1 and further comprising a distribution plate rotatably mounted above said opening for distributing charged powder and granular materials evenly over said working plate, said distribution plate having a larger diameter than said opening of said working plate.

* * * * *